United States Patent [19]

Thyberg et al.

[11] 4,047,709

[45] Sept. 13, 1977

[54] CLAMPING DEVICE FOR WORK PIECES OF IRREGULAR SHAPE

[75] Inventors: Bertil Sven Johan Thyberg; Karl Arne Stig Elmgren, both of Huskvarna, Sweden

[73] Assignee: AB Westin & Backlund, Stockholm, Sweden

[21] Appl. No.: 725,035

[22] Filed: Sept. 20, 1976

[30] Foreign Application Priority Data

Sept. 25, 1975 Sweden .................................. 7510731

[51] Int. Cl.² ............................................. B23Q 3/08
[52] U.S. Cl. .................................... 269/22; 269/228; 269/254 CS; 269/266
[58] Field of Search .................. 269/20, 22, 25, 32, 269/228, 266, 254 CS

[56] References Cited

U.S. PATENT DOCUMENTS

| 2,658,415 | 11/1953 | Barowsky | 269/266 |
| 2,754,708 | 7/1956 | Peterson | 269/266 |
| 3,604,700 | 9/1971 | Gault | 269/266 |
| 3,858,468 | 1/1975 | Pasbrig | 269/266 |

Primary Examiner—Robert C. Watson
Attorney, Agent, or Firm—Schiller & Pandiscio

[57] ABSTRACT

The invention relates to apparatus for supporting or clamping bodies of irregular shape, (particularly large workpieces) comprising a clamping jaw, in the form of a box with axially moveable plungers extending from its work face, said plungers being supported in different axial positions, determined by contact with the surface of the workpiece, by a solid medium within the box. Known apparatus do not have positive means for locking the plungers in their positions. The invention provides a simple and effective locking arrangement in which the solid medium is a multiplicity of hard balls, each plunger is formed with ball-receiving cavities, and application of a pressure to the balls is transmitted via the ball-receiving cavities to lock said plungers.

16 Claims, 9 Drawing Figures

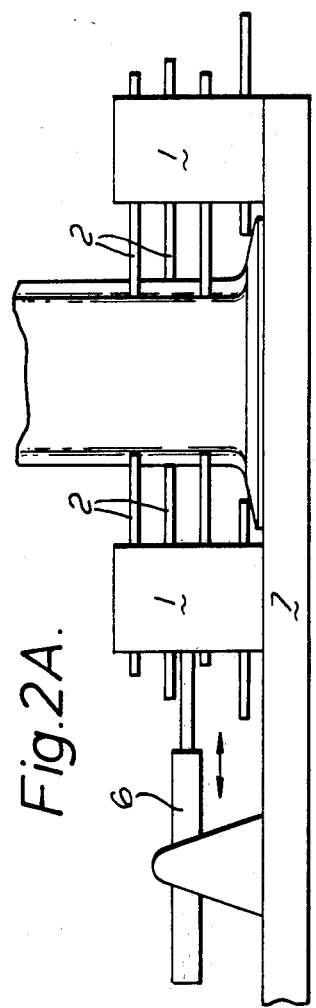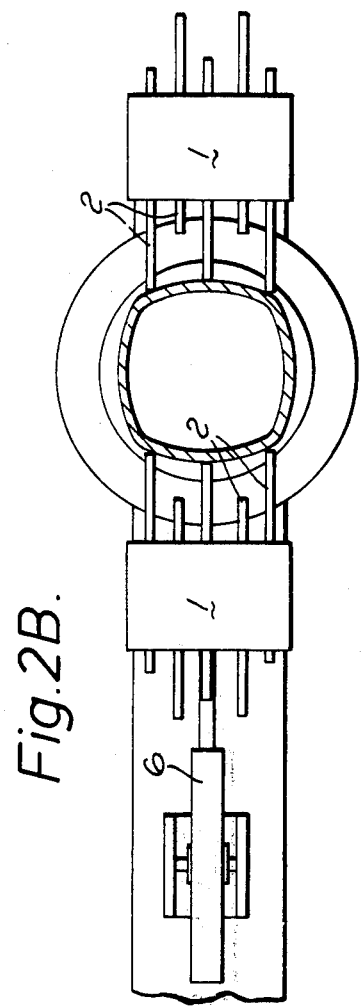

CLAMPING DEVICE FOR WORK PIECES OF IRREGULAR SHAPE

The task of positively supporting or clamping bodies of irregular shape, (e.g. cast or forged blanks or other workpieces) for use in connecting with the machining of said bodies, or of facilitating assembly of components onto the bodies, etc., often creates a serious problem, requiring complicated and expensive apparatus. In the case of workpieces which are not mass produced in great numbers, the cost of specially designed clamping apparatus or jigs is often troublesomely high.

In order to clamp a workpiece positively, the gripping surface or surfaces of the apparatus must engage the workpiece at several different points thereon.

Apparatus are known which are generally of the kind comprising one or more clamping jaws, each in the form of a box with a multiplicity of individual axially movable rod like elements or plungers extending from one side wall of said box: some of these boxes are partially filled with a solid medium which acts to support the rods or the plungers in different axial positions determined by contact with the irregular surface of said workpiece. The flexibility of the prior known apparatus, however, is restricted, particularly in view of the fact that the degree of positive clamping is limited.

An object of the invention is to provide apparatus in which a high degree of positive clamping is quickly effected by a simple and robust construction, this being enabled by the use of a new principle for locking the gripping plungers, which latter yield on initial contact with the workpiece to be gripped to conform to the shape of the workpiece.

According to the present invention, apparatus for supporting or clamping bodies of the kind discussed hereinbefore, is characterised in that the box is mainly closed and the solid medium comprises a multiplicity of hard balls, in that the plungers are biased towards extended positions through apertures in at least the work face of said box, in that each plunger has arranged along at least part of its length ball-receiving cavities; and in that the force of locking the plungers is provided by the application of a pressure to the balls separate from that exerted by inward movement of the plungers in use, this pressure being transmitted via the balls and their receiving cavities to said plungers.

Movement of the or each clamping jaw may be effected by means of pneumatic or hydraulic cylinders, or by means of a purely mechanical arrangement, which, with jaws of greater size and weight, can be combined with a modified air-cushion technique for reducing the forces needed to effect said movement.

In one application, apparatus according to the invention is constructed with one fixed and one moveable clamping jaw, each in the form of a closed box and of varying size, there being provided a varying number of moveable and lockable plungers in both said jaws. Alternatively, one jaw may be completely devoid of plungers, while the other is provided with the plungers.

If the body or workpiece to be held is of sufficient weight (e.g. a motor vehicle engine) the apparatus can be simplified to comprise one clamping jaw only, in the form of a box arranged with its work face horizontal, and provided with an appropriate number of vertically extending, axially displaceable and lockable plungers.

In order that the invention will be readily understood and further features made apparent, a number of embodiments thereof will now be described with reference to the accompanying drawings, in which:

FIGS. 2A and 2B are respectively side and plan views of clamping apparatus embodying two clamping jaws.

Figure 1A:
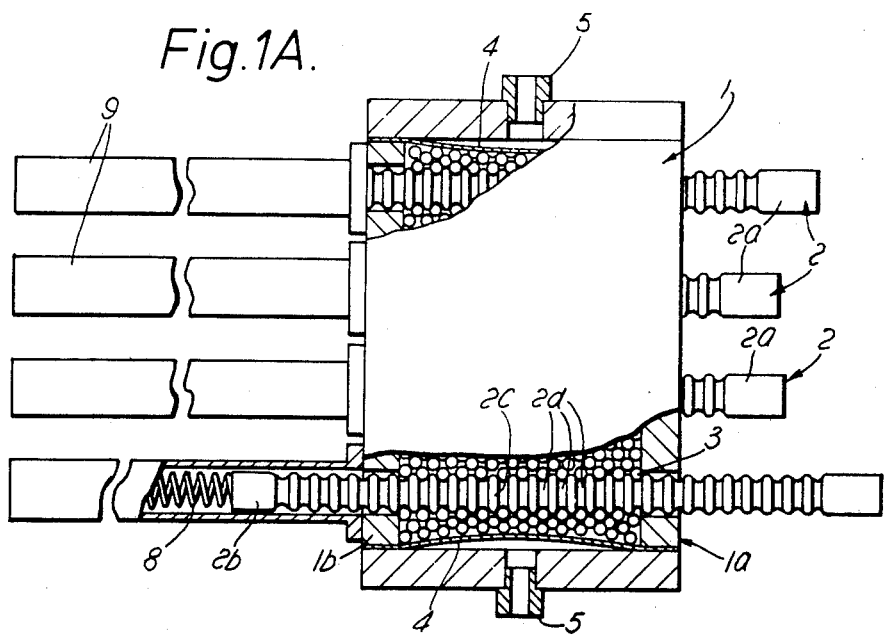
FIGS. 1A and 1B show respectively a part-sectional plan view and an end view of a first embodiment of a clamping jaw.

Before describing specific embodiments of the invention, a short description will be given of a complete apparatus using a clamping jaw arrangement in accordance with the invention. Such an apparatus is shown in FIGS. 2A and 2B.

The apparatus shown in FIGS 2A and 2B comprises one or more jaws 1, one at least of which is arranged for movement on a work-bench 7. In the illustrated apparatus, one jaw is immovably fixed to the work-bench whilst the other jaw is arranged for movement therealong towards and away from the fixed jaw. The movable jaw 1 is moved on the workbench 7 by means of a servo mechanism which may, for example, have the form of a pneumatic or hydraulic cylinder-piston arrangement 6, the servo mechanism being arranged to apply to the jaw the force required to move it into engagement with a workpiece between the two jaws. The cylinder of the piston-cylinder arrangement is fixedly mounted to the workbench, while the piston of said arrangement is arranged to move the movable jaw at least in a direction towards the workpiece.

Although the provision of a servo mechanism is preferred for effecting the movement of the movable jaw, the provision of purely mechanical arrangements for effecting such movement is conceivable.

If the weight and size of the jaws is large, movement of the jaws can be facilitated by the use of an air cushion, i.e. by introducing compressed air in a suitable manner into the space between the flat undersurface of the bottom wall of the jaw and the cooperating flat upper surface of the workbench 7 forming a frame or table for the clamping apparatus.

Figure 1B:
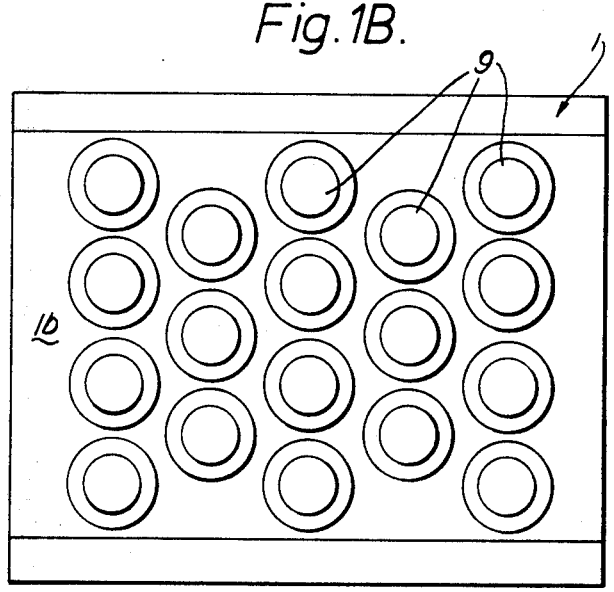

Referring to FIG. 1A and 1B, a first embodiment of a clamping jaw according to the invention comprises a substantially closed box 1 having a number of plungers 2 extending parallel to each other and extending through aligned apertures in two opposed end walls, 1a, 1b, of the box, the wall 1a, comprising the work face of the jaw. The plungers 2 each have head and foot portions 2a, 2b and an intermediate portion 2c of suitably reduced cross-section. The intermediate portion 2c of each plunger is provided with a series of grooves 2d of rounded cross-section for a purpose to be referred to hereinafter. Although not shown, the intermediate portion 2c may be provided with a screw-thread like surface.

The interior of the box is substantially filled with hard balls 3, for example, or hardened steel having a good surface finish, to which balls a pressure can be applied such that all areas of respective balls are subjected to said pressure during a clamping operation. Provided that no pressure is applied to the balls 3 in the interior of the jaw box 1, or that any pressure applied thereto is insignificant the clamping plungers 2 are readily movable axially through their respective apertures to adopt mutually different axial positions. The particular position adopted by a respective plunger in the box depends on the counter of the portion of the workpiece in contact with said plunger. The high degree of conformity of the abutment points of the plungers onto the workpiece to be gripped as achieved partly by an initial biassing force applied to each plunger to urge the same towards the workpiece and partly by movement of a jaw towards said workpiece. As shown in FIG. 1A, the biassing force may be provided by coil springs 8 enclosed in respective blind tubes 9, each of which encircles a respective foot portion 2b of a plunger.

Subsequent to adjustment of the plungers so as to conform with the shape of the workpiece, the plungers are locked by applying pressure to all areas of the balls 3 filling the interior of the jaw box 1 as described above.

When pressure is applied to the balls 3, so that they are urged into close contact with each other and with the intermediate portions 2c of the plungers, certain of said balls will enter completely or partially into the rounded grooves 2d and the plungers are thereby locked axially with respect to their jaw box 1. This pressure can be applied by lining one or more walls of the jaw box 1 internally with a membrane 4 of impervious material, such as rubber or plastics, to which membrane a suitably selected air pressure is applied. Each membrane 4 is stretched across the inner face of its respective wall, and hence, pressure may be applied simply by introducing a working medium or fluid, such as air, through a nipple 5 and against the rear face of said membrane; the membrane will thus bulge out and press against the mass of the balls 3 within the box 1 thereby exerting pressure on all areas of the balls. In FIG. 1A, two membranes 4 are provided on the upper and lower walls respectively of the box 1.

As an alternative to the aforedescribed arrangement, the working medium can be introduced between double membranes of rubber or plastics located within the mass of balls 3, the outer edges of the membranes being attached in the walls of the jaw, which in this case comprises buildable sections.

The pressure can also be provided by introducing a working medium into tubular expandable bodies arranged within the mass of balls and provided with rubber or plastic feed hoses, or by driving one or more wedge-shaped or conical bodies through holes in the walls of the jaw.

Figure 3:
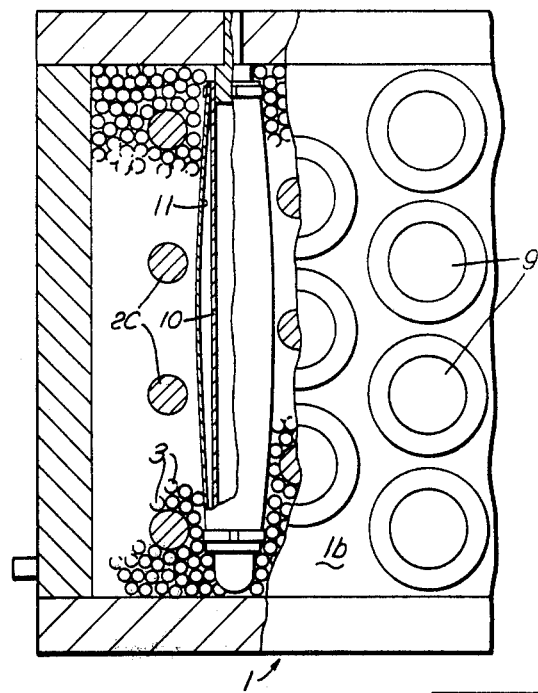
FIGS. 3 and 4 illustrate modified arrangements of the clamping jaw of FIG. 1 for producing the requisite pressure on the mass of balls.

An embodiment incorporating the above mentioned expandable bodies within the mass of balls is shown in FIG. 3 and comprises a tube 10 with slots or bores extending through the wall thereof surrounded and enclosed by a sealed stretchable hose 11, for example, made of rubber. By introducing a working medium, such as compressed air, into the tube 10, the hose, which is attached and sealed at both ends thereof, expands and provides for the desired pressure to be exerted into the mass of balls 3. If necessary, a plurality of such expandable bodies can be arranged in the mass of balls 3.

Figure 4:
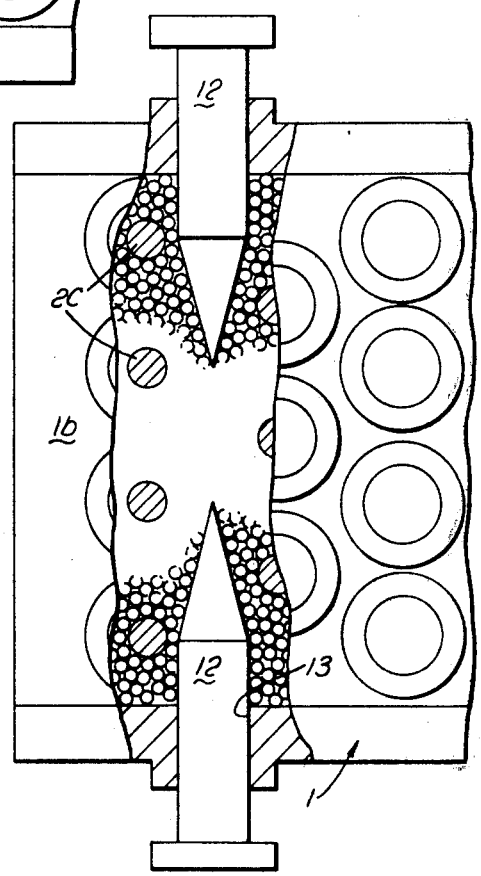

A further embodiment, which has been tested and has given good results for applying pressure to the mass of balls, is shown in FIG. 4 and comprises one or more wedge-shaped or conical ended bodies 12, each of which is pressed through guide apertures 13 extending through the walls of the jaw into contact with the mass of balls 3.

If the workpiece to be gripped is sufficiently heavy, only one jaw need be provided with the aforedescribed lockable plunger arrangement. In such a case, the clamping jaw is preferably arranged with its work face 1a horizontal and with the spring-loaded plungers extending vertically upwardly. When the workpiece of irregular shape is placed in position, the plungers will move individually so as to conform to the contours of the workpiece, the workpiece being well supported due to its heavy weight and, preferably, also well secured laterally.

Figure 5:
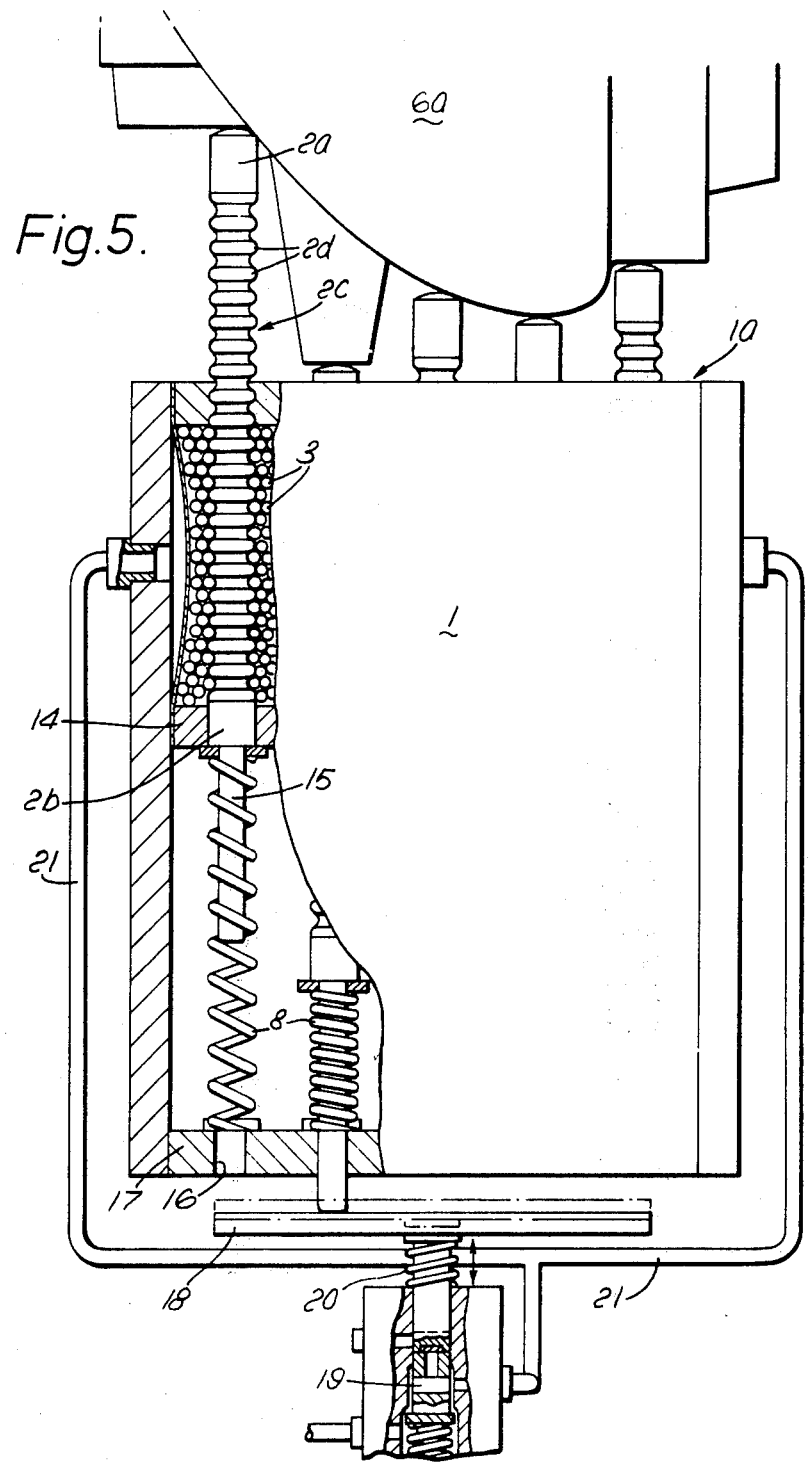
FIG. 5 is a part-sectional elevation of a second embodiment of a clamping jaw.

A number of arrangements are conceivable for ensuring that the plungers conform suitably to the contours of the workpiece placed thereon, and that the plungers are quickly locked in their different axially adjusted positions. One such arrangement is shown in FIG. 5. In this embodiment the plungers 2 extend from the work face 1a through apertures in an internal wall 14 of the jaw box 1, said internal wall extending parallel to said work face, the foot portion 2b of each plunger having an extended neck 15 which can be urged through apertures 16 in the opposite end wall 17 of the jaw box, depending upon the extent of movement of the plunger needed for its head portion 2a to yield and conform to the profile of the workpiece.

A plate 18 is spaced from the wall 17 in the movement path of the plungers, which latter are normally biassed towards the workpiece by the springs 8. The plate 18 is connected, either directly or indirectly, to a valve 19 for controlling the flow of a working medium from a source of pressure (not shown), said medium being intended for exerting the pressure to lock the plungers 2. When the workpiece 6a is gripped, the plungers initially yield towards the work face 1a and are thereby adjusted axially so that their head portions 2a conform to the outline of the workpiece. Thus, after yielding, all the plungers 2 will move towards the plate 18, those located beneath areas of the workpiece exhibiting the most pronounced bulges moving the greatest axial distance and into contact with the plate 18. Continued movement of the or each plunger in contact with the plate 18 causes the latter to move against the action of a spring 20 to cause the valve 19 to open, and thereby initiate the locking pressure via lines 21.

Figure 6:
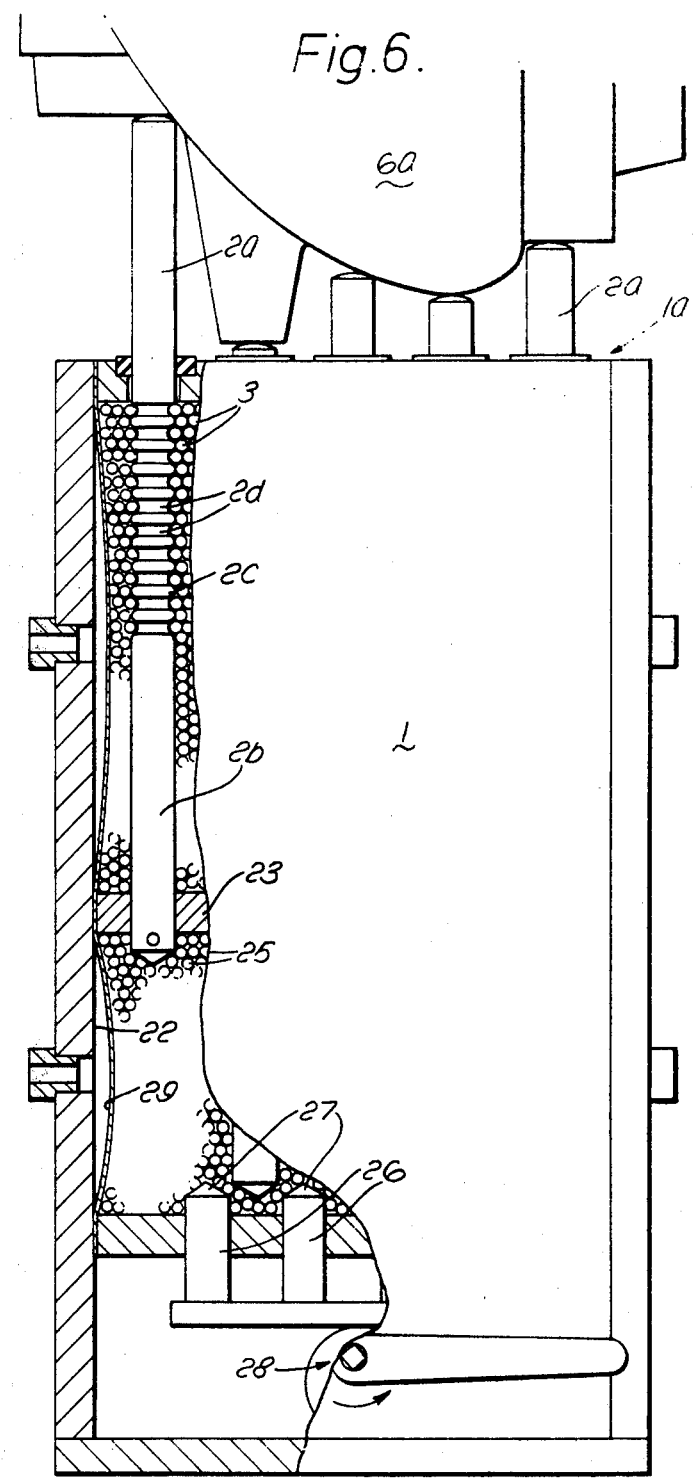
FIGS. 6 and 7 are views similar to FIG. 5 of third and fourth embodiments of a clamping jaw.

A further arrangement involves considerable modification of the clamping jaw 1 described with reference to FIG. 1. Such an arrangement is shown in FIG. 6. Thus, the plungers 2, which in this embodiment are not biassed by springs, terminate at their foot portions 2b in a closed space 22 arranged within the jaw box 1 between two spaced internal walls 23, 24, extending parallel to work face 1a. To provide the biassing force to the plungers, the space 22 is filled with further hard balls 25, made of hardened steel, for example. To adjust the pressure exerted by the balls 25 in the space 22, one or more rods 26 having conically-shaped ends 27 can be inserted through apertures in the wall 24 into the mass of balls 25 up to differing depths. Insertion of the rods 26 can be facilitated by means of a cam and lever arrangement generally denoted 28. Pressure on the balls 25 is thus exerted by axial movement of the rods 26, the ends of which, in turn, move the balls to one side. Subsequent to removal of the workpiece 6a, the plungers can be moved to a suitable position for receiving a further workpiece, by inserting the rods 26 into the mass of balls 25 to a corresponding extent. Alternatively, the plungers 2 can be moved axially towards the workpiece by means of a further membrane 29 extending across a wall of the space 22 in a similar manner to the membrane 4 described hereinbefore. By applying pressure to the rear face of the further membrane 29, the balls 25 will be displaced so as to cause the plungers to be biassed towards the workpiece.

A further alternative resides in a combination of the pressure exerted by rods 26 and a further membrane 29.

With the embodiment of FIG. 6, as the plungers 2 are pressed by the workpiece into the jaw box 1, they displace the balls 25 in the space 22 until all the free space therein is occupied by the balls, whereafter no further displacement of the balls can take place and the plungers rest on a solid foundation created by the immovably packed balls. However, with the clamping jaw according to FIG. 6, the basic arrangement described with reference to FIG. 1 is additionally provided to ensure that the plungers are positively locked by the balls 3 acting on the rounded grooves 2d provided in the intermediate portions 2c on the plungers 2.

Figure 7:
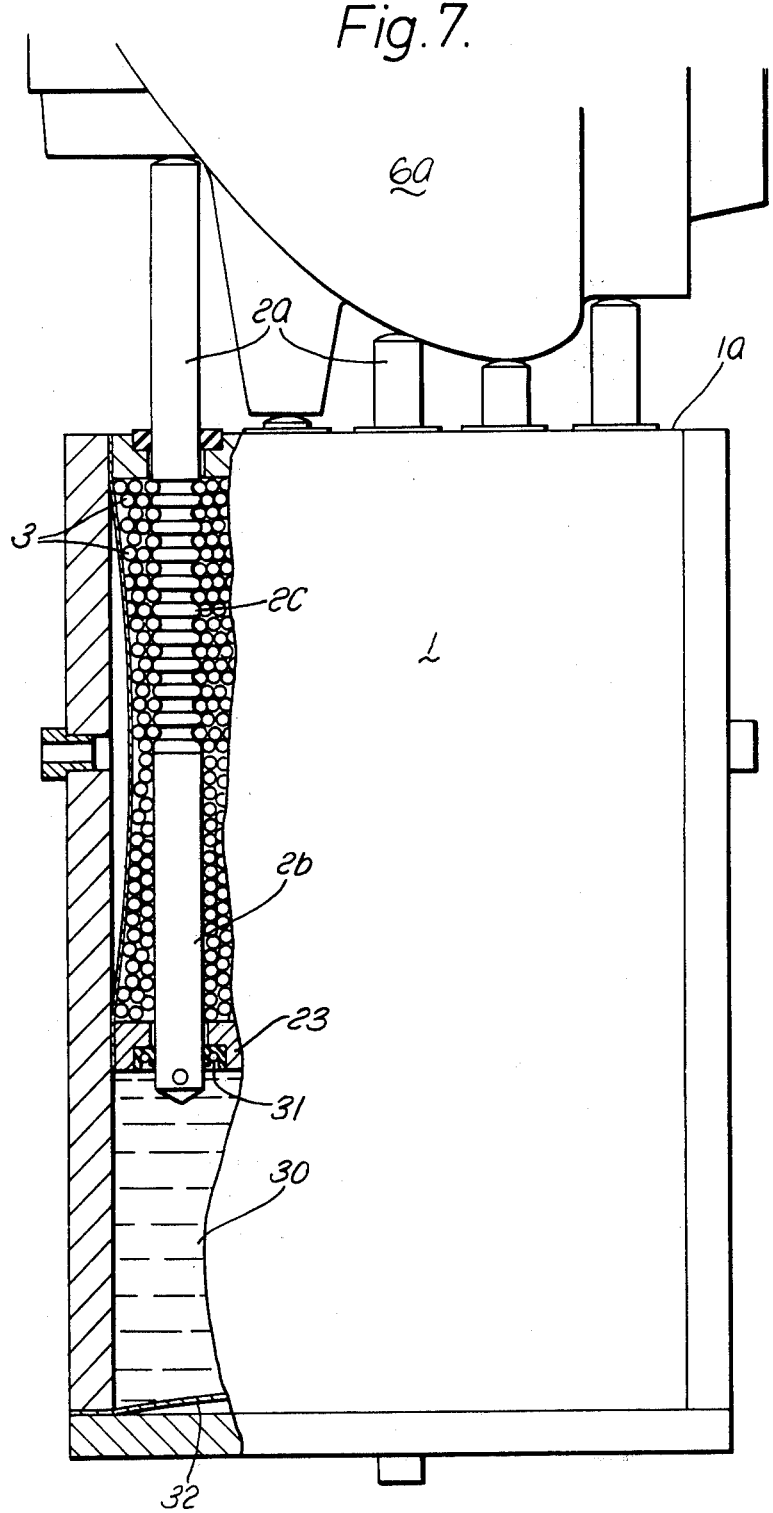

In accordance with a further embodiment, the balls 25 described with reference to FIG. 6, may be replaced with a highly viscous or doughy substance 30, such as oil or pitch, as illustrated in FIG. 7. This would require, however, efficient seals 31 between the internal chambers of the jaw box 1, particularly, as shown in the Figure, at those points where the plungers 2 extend through the internal wall 23. As also shown in the Figure, pressure is exerted on the substance via a further membrane 32.

We claim:

1. Apparatus for supporting or clamping bodies or irregular shape, (e.g. cast or forged blanks or other workpieces) comprising one or more clamping jaws, each in the form of a box with a multiplicity of individual axially moveable plungers extending from at least one side wall of said box, which box is partially filled with a solid medium which acts to support the plungers in different axial positions determined by contact with the irregular surface of said body, characterised in that the box is mainly closed and the solid medium comprises a multiplicity of hard balls, in that the plungers are biassed towards extended positions through apertures in at least the work face of said box, in that each plunger has arranged along at least part of its length ball-receiving cavities; and in that the force for locking the plungers is provided by the application of a pressure to the balls separate from that exerted by inward movement of the plungers in use, this pressure being transmitted via the balls and their receiving cavities to said plungers.

2. Apparatus according to claim 1, characterised in that pressure is applied to the hard balls by the introduction of a pressure medium, such as air, between one or more of the sides of the box comprising the jaw, and a membrane of impervious flexible material (e.g. rubber or plastics) arranged within said box adjacent said wall or walls.

3. Apparatus according to claim 1, characterised in that the pressure is applied to said balls by introduction of a pressure medium between one or more pairs of double membranes mounted within the mass of balls, said membranes being securely mounted at the outer edges thereof between the sides of the boxes comprising the jaw, said jaw comprising buildable sections.

4. Apparatus according to claim 1, characterised in that the pressure is applied to the balls by means of expansion bodies in intimate contact with the balls, or by the introduction of conical or wedge-shaped bodies through holes in one or more walls of the box comprising the jaw.

5. Apparatus according to claim 1, characterised in that the plungers are biassed to their extended axial positions through the work face of their jaw by means of coil springs.

6. Apparatus according to claim 1, characterised by a construction having one fixed and one movable clamping jaw.

7. Apparatus according to claim 1, characterised by a construction having two moveable jaws.

8. Apparatus according to claim 6, characterised in that movement of the moveable jaw, and also the appliance of the requisite clamping force, is produced with one or more pneumatic or hydraulic cylinders, or by a purely mechanical arrangement.

9. Apparatus according to claim 6, characterised in that said one moveable jaw is made readily moveable by means of an air-cushion arrangement.

10. Apparatus according to claim 1, characterised in that means are arranged in the movement path of the plungers so as to be operable, in use, to initiate the locking force.

11. Apparatus according to claim 10, characterised in that said means comprises a plate which is normally spaced from the inner ends of said plungers, and valve means for controlling a working fluid which provides the pressure for the locking force, the arrangement being such that movement of the plate caused by inward movement of one or more plungers acts to open the valve means to release the working fluid.

12. Apparatus according to claim 1, characterised in that said box is divided into first and second chambers by an internal wall, said plungers extending from their work face through the first chamber and through apertures in said internal wall into the second chamber, the second chamber having a compactible material therein which, when compacted, provides the bias for said plungers and a support surface therefor.

13. Apparatus according to claim 12, characterised in that the compactible material comprises hard balls, and the means for compacting the balls comprise rods which are adjustably moveable into second chamber and or a further membrane and associated pressure source.

14. Apparatus according to claim 1, wherein the ball receiving cavities comprise a series of grooves extending radially around the circumferential surface of the plungers.

15. Apparatus according to claim 7, characterized in that movement of the movable jaws, and also the appliance of the requisite clamping force, is produced with one or more pneumatic or hydraulic cylinders, or by a purely mechanical arrangement.

16. Apparatus according to claim 7, characterized in that said jaws are made readily moveable by means of an air-cushion arrangement.

* * * * *